(12) United States Patent
Anderson et al.

(10) Patent No.: US 8,132,055 B2
(45) Date of Patent: Mar. 6, 2012

(54) OPERATING SYSTEM-FIRMWARE INTERFACE UPDATE RECOVERY

(75) Inventors: Paul L. Anderson, Raleigh, NC (US); William E. Atherton, Raleigh, NC (US); Tu T. Dang, Raleigh, NC (US); Michael C. Elles, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 12/622,969

(22) Filed: Nov. 20, 2009

(65) Prior Publication Data
US 2011/0126043 A1 May 26, 2011

(51) Int. Cl.
*G06F 11/00* (2006.01)
(52) U.S. Cl. .............................. 714/36; 713/1; 713/2
(58) Field of Classification Search .................. 714/36; 713/1, 2
See application file for complete search history.

(56) References Cited

U.S. PATENT DOCUMENTS

| | | | |
|---|---|---|---|
| 5,864,698 A | 1/1999 | Krau et al. | |
| 6,167,532 A | 12/2000 | Wisecup | |
| 6,640,316 B1 * | 10/2003 | Martin et al. | 714/36 |
| 6,732,267 B1 * | 5/2004 | Wu et al. | 713/100 |
| 6,986,034 B2 * | 1/2006 | Tyner et al. | 713/2 |
| 7,047,352 B1 | 5/2006 | Khu et al. | |
| 7,131,026 B2 * | 10/2006 | Denninghoff et al. | 714/6.3 |
| 7,203,831 B2 * | 4/2007 | Wu et al. | 713/100 |
| 7,313,685 B2 | 12/2007 | Broyles, III et al. | |
| 7,337,309 B2 * | 2/2008 | Nguyen et al. | 713/1 |
| 7,487,345 B2 * | 2/2009 | Khatri et al. | 713/100 |
| 7,500,095 B2 * | 3/2009 | Mahmoud et al. | 713/2 |
| 7,840,796 B2 * | 11/2010 | Dayan et al. | 713/2 |

(Continued)

OTHER PUBLICATIONS

Toledo; et al.; Algorithms and Data Structures for Flash Memories; ACM Computing Surveys; Jun. 2005; pp. 138-163; vol. 37, No. 2ACM, New York, N.Y., U.S.A.

(Continued)

*Primary Examiner* — Yolanda L Wilson
(74) *Attorney, Agent, or Firm* — H. Barrett Spraggins; Thomas E. Tyson; Biggers & Ohanian, LLP

(57) ABSTRACT

Operating system ('OS')-firmware interface update recovery including determining, for each of a plurality of available OS-firmware interface images for booting a computer, whether each available OS-firmware interface image is corrupted or uncorrupted; setting, for each corrupted OS-firmware interface image, a predictive failure analysis ('PFA') bit in nonvolatile memory available to the OS-firmware interface update recovery module; selecting an uncorrupted OS-firmware interface image; initiating a boot for the computer with the selected OS-firmware interface image; determining whether a previous update to one of the available OS-firmware interface images was interrupted; and notifying a user that the previous update was interrupted if the previous update to one of the available OS-firmware interface images interrupted.

16 Claims, 2 Drawing Sheets

U.S. PATENT DOCUMENTS

| | | | |
|---|---|---|---|
| 2002/0066009 A1* | 5/2002 | Tung | 713/1 |
| 2004/0205329 A1* | 10/2004 | Wu et al. | 713/2 |
| 2005/0081024 A1* | 4/2005 | Khatri et al. | 713/100 |
| 2005/0132179 A1* | 6/2005 | Glaum et al. | 713/1 |
| 2005/0160257 A1* | 7/2005 | Kruger et al. | 713/2 |
| 2005/0229173 A1 | 10/2005 | Mihm et al. | |
| 2005/0278518 A1* | 12/2005 | Ko et al. | 713/1 |
| 2007/0050612 A1 | 3/2007 | Chen | |
| 2008/0126784 A1* | 5/2008 | Iima et al. | 713/2 |
| 2009/0320012 A1* | 12/2009 | Lee et al. | 717/168 |
| 2011/0055533 A1* | 3/2011 | Mudusuru et al. | 713/1 |

OTHER PUBLICATIONS

Castro, et al.; Base: Using Abstraction to Improve Fault Tolerance; ACM Trnasactions on Computer Systems; Aug. 2003; pp. 236-269; vol. 21 No. 3, New York, N.Y., U.S.A.

Castro, et al; Practical Byzantine Fault Tolerance and Proactive Recovery; Nov. 2002; pp. 398-461; ACM Transactions on Computer Systems; vol. 20, No. 4; ACM; Cambridge, MA., U.S.A.

Intel Server Board SE7520BD2; Technical Product Specification; Jun. 15, 2005; Revision 2.3; pp. 1-191.

* cited by examiner

US 8,132,055 B2

OPERATING SYSTEM-FIRMWARE INTERFACE UPDATE RECOVERY

BACKGROUND OF THE INVENTION

1. Field of the Invention

The field of the invention is data processing, or, more specifically, methods, apparatus, and products for OS-firmware interface update recovery.

2. Description of Related Art

In modern personal computers, the system BIOS (Basic Input/Output System), a form of operating system-firmware interface, resides in nonvolatile EEPROM or flash memory. The BIOS is updated to add new functions, to provide new hardware support, or to fix known problems. Although flash updating the BIOS EEPROM, overwriting the older BIOS with a newer version, is a widely accepted method for BIOS updating, any un-expected interruption that occurs during the BIOS update process may cause the system to become disabled. Unexpected interruptions may come from sources such as power loss, bad or wrong code image, or signal quality. The conventional BIOS update recovery process usually involves a sequence of steps carried out by an end user. Such steps typically include disconnecting the power from the system, removing system from the rack, removing the mechanical cover, removing the adapter(s) to find a jumper on the board using the jumper on the board to boot up again from either an alternate BIOS image, or a Boot Block.

SUMMARY OF THE INVENTION

Operating system ('OS')-firmware interface update recovery including determining, by an OS-firmware interface update recovery module for each of a plurality of available OS-firmware interface images for booting a computer, whether each available OS-firmware interface image is corrupted or uncorrupted, wherein the OS-firmware interface update recovery module comprises a module of automated computing machinery; setting, by the OS-firmware interface update recovery module for each corrupted OS-firmware interface image, a predictive failure analysis ('PFA') bit in nonvolatile memory available to the OS-firmware interface update recovery module; selecting, by the OS-firmware interface update recovery module, an uncorrupted OS-firmware interface image; initiating, by the OS-firmware interface update recovery module, a boot for the computer with the selected OS-firmware interface image; determining, by the OS-firmware interface update recovery module during the POST function of booting the computer in dependence upon a flash-in-progress bit set in nonvolatile memory available to the OS-firmware interface update recovery module, whether a previous update to one of the available OS-firmware interface images was interrupted; and notifying, by the OS-firmware interface update recovery module, a user that the previous update was interrupted if the previous update to one of the available OS-firmware interface images interrupted.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
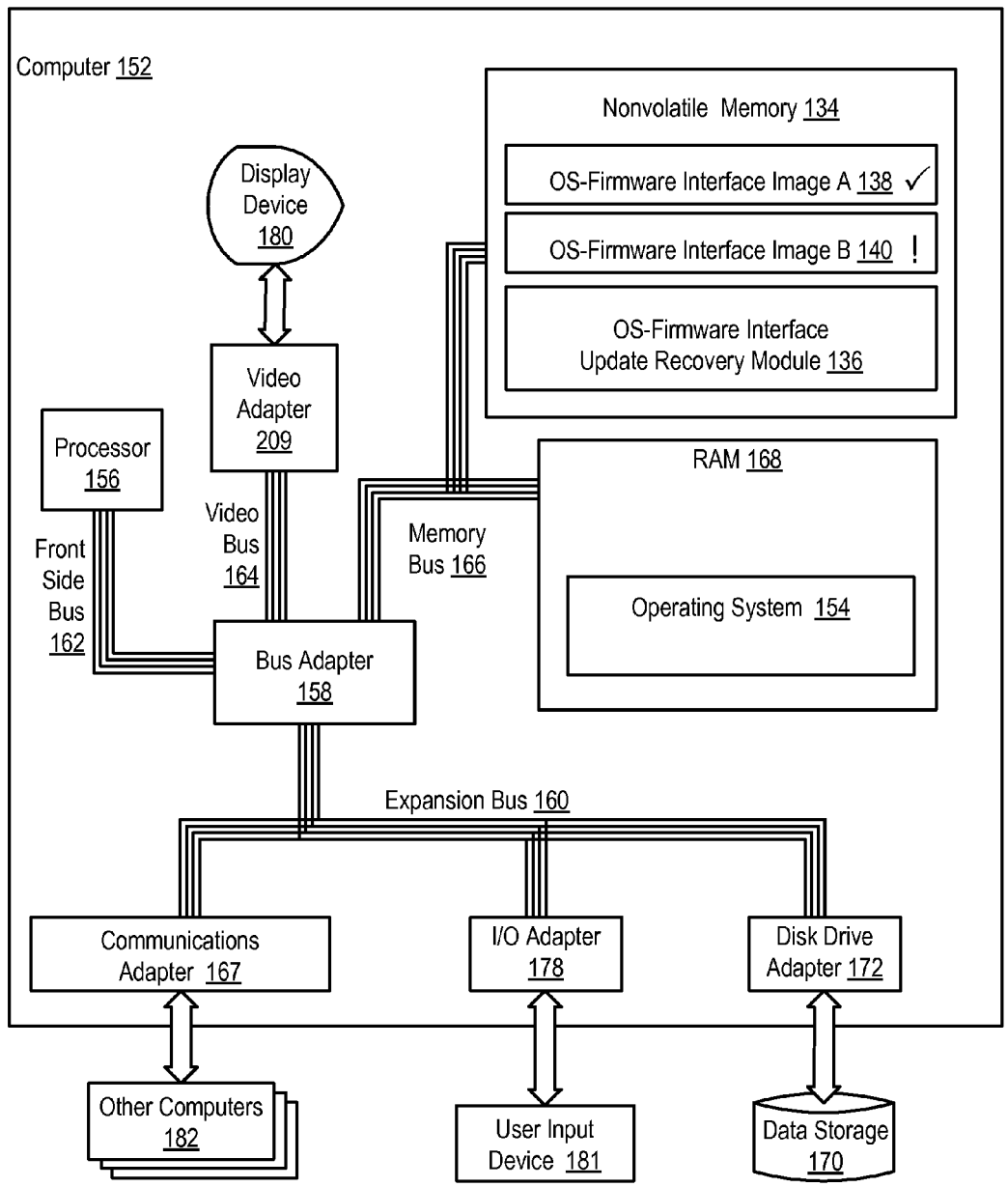
FIG. 1 sets forth a block diagram of automated computing machinery comprising an exemplary computer useful in OS-firmware interface update recovery according to embodiments of the present invention.

Exemplary methods, apparatus, and products for OS-firmware interface update recovery in accordance with the present invention are described with reference to the accompanying drawings, beginning with FIG. 1. FIG. 1 sets forth a block diagram of automated computing machinery comprising an exemplary computer (152) useful in OS-firmware interface update recovery according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The computer of FIG. 1 includes nonvolatile computer memory (134) implemented as an optical disk drive, electrically erasable programmable read-only memory (so-called 'EEPROM' or 'Flash' memory). Stored in the nonvolatile memory (134) are two Operating System ('OS')-firmware interface images. An OS-firmware interface image of FIG. 1 is an image of an interface that passes control of the system after the system is powered on, but before starting the operating system (154). The initial functions of the OS-firmware interface typically include identifying, testing, and initializing system devices such as the video display card, hard disk, floppy disk and other hardware. OS-firmware interfaces according to embodiments of the present invention include Basic Input/Output System ('BIOS'), Unified Extensible Firmware Interface ('UEFI'), and others as will occur to those of skill in the art.

BIOS (basic input/output system) is the program originally conceived to get a personal computer ('PC') started after power-on. The BIOS also manages pre-boot data flow between the computer's operating system and attached devices such as the hard disk, video adapter, keyboard, and mouse. When the BIOS starts up a computer, it first determines whether all of the attachments are in place and operational and then it loads the operating system, or key parts of the operating system, into the computer's RAM memory from non-volatile storage.

UEFI (Unified Extensible Firmware Interface) is a community effort of many companies in the personal-computer industry to modernize the booting process. UEFI is a specification detailing an interface that passes control of the system for the pre-boot environment to an operating system. UEFI provides an interface between operating systems and platform firmware at boot time, and supports an architecture-independent mechanism for initializing add-in cards, such as expansion boards, adaptor cards, accessory cards and so on.

Also stored in the nonvolatile memory (134) is an OS-firmware interface update recovery module (136) a module of computer program instructions for OS-firmware interface update recovery according to embodiments of the present invention. The OS-firmware interface update recovery module (136) is capable of OS-firmware interface update recovery by determining for each of a plurality of available OS-firmware interface images (138 and 140) for booting a computer, whether each available OS-firmware interface image (138 and 140) is corrupted or uncorrupted and setting a predictive failure analysis ('PFA') bit in nonvolatile memory available (134) to the OS-firmware interface update recovery module for each corrupted OS-firmware interface image (140). The OS-firmware interface update recovery module (136) of FIG. 1 determines whether the OS-firmware interface images (138 and 140) are corrupted or uncorrupted by calculating a checksum of each image and comparing the checksum of each image with a known checksum of an uncorrupted version of that image. In the example of FIG. 1, OS-firmware interface image A is determined to be uncorrupted and OS-firmware interface image B is determined to be corrupted. In the example of FIG. 1, the uncorrupted image A is so designated with the check symbol, '✓', and the corrupted image B is so designated with the exclamation mark, '!'.

The OS-firmware interface update recovery module (136) of FIG. 1 is also capable of selecting an uncorrupted OS-firmware interface image, loading the selected uncorrupted OS-firmware interface image into RAM (168), and initiating a boot for the computer with the selected OS-firmware interface image.

The OS-firmware interface update recovery module (136) is also capable of determining (216), during the POST function of booting the computer in dependence upon a flash-in-progress bit set in nonvolatile memory (134) available to the OS-firmware interface update recovery module (136) whether a previous update to one of the available OS-firmware interface images (138 and 140) was interrupted. A flash-in-progress bit is a well-known bit in nonvolatile memory used to designate that an OS-firmware interface image is currently being updated. If the flash-in-progress bit is set to true then an OS-firmware interface image is currently being updated and if the bit is set to false then the OS-firmware interface image is currently not being updated. If during the POST function of booting the computer the flash-in-progress bit is set to true, then the a previous update to an OS-firmware interface image was interrupted prior to completing because if the update was properly completed the flash-in-progress bit would have been restored to false.

In some embodiments of the present invention, a single flash-in-progress bit is used for all the OS-firmware interface images. In such cases, if during the POST function of booting the computer the flash-in-progress bit is set to true, then the a previous update to any one of the OS-firmware interface images was interrupted prior to completing. In other embodiments of the present invention, a flash-in-progress bit is used for each of the OS-firmware interface images. In such cases, if during the POST function of booting the computer the flash-in-progress bit is set to true, then a previous update to the selected uncorrupted OS-firmware interface images currently booting the computer was interrupted.

The OS-firmware interface update recovery module (136) of FIG. 1 is also capable of notifying a user that the previous update was interrupted if the previous update to one of the available OS-firmware interface images interrupted.

The OS-firmware interface update recovery module (136) of FIG. 1 is also capable of notifying (220) a user of all of the corrupted OS-firmware interface images if the previous update to one of the available OS-firmware interface images was not interrupted and clearing all the PFA bits after notifying the user of all the corrupted OS-firmware interface images.

The OS-firmware interface update recovery module (136) of FIG. 1 is also capable of receiving an instruction to update the OS-firmware interface image whose update was previously interrupted and updating the OS-firmware interface image whose update was previously interrupted In the example of FIG. 1, the OS-firmware interface update recovery module (136) is shown stored in nonvolatile memory (134). While the OS-firmware interface update recovery module (136) may be permanently stored in non-volatile memory upon execution the computer program instructions of the OS-firmware interface update recovery module (136) may be loaded into RAM (168) and executed from the RAM (168) for more efficient execution.

In the computer of FIG. 1, stored in RAM (168) is an operating system (154). Operating systems useful for OS-firmware interface update recovery according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for OS-firmware interface update recovery according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for OS-firmware interface update recovery according to embodiments of the present invention include modems for wired dial-up communications, Ethernet (IEEE 802.3) adapters for wired data communications network communications, and 802.11 adapters for wireless data communications network communications.

Figure 2:
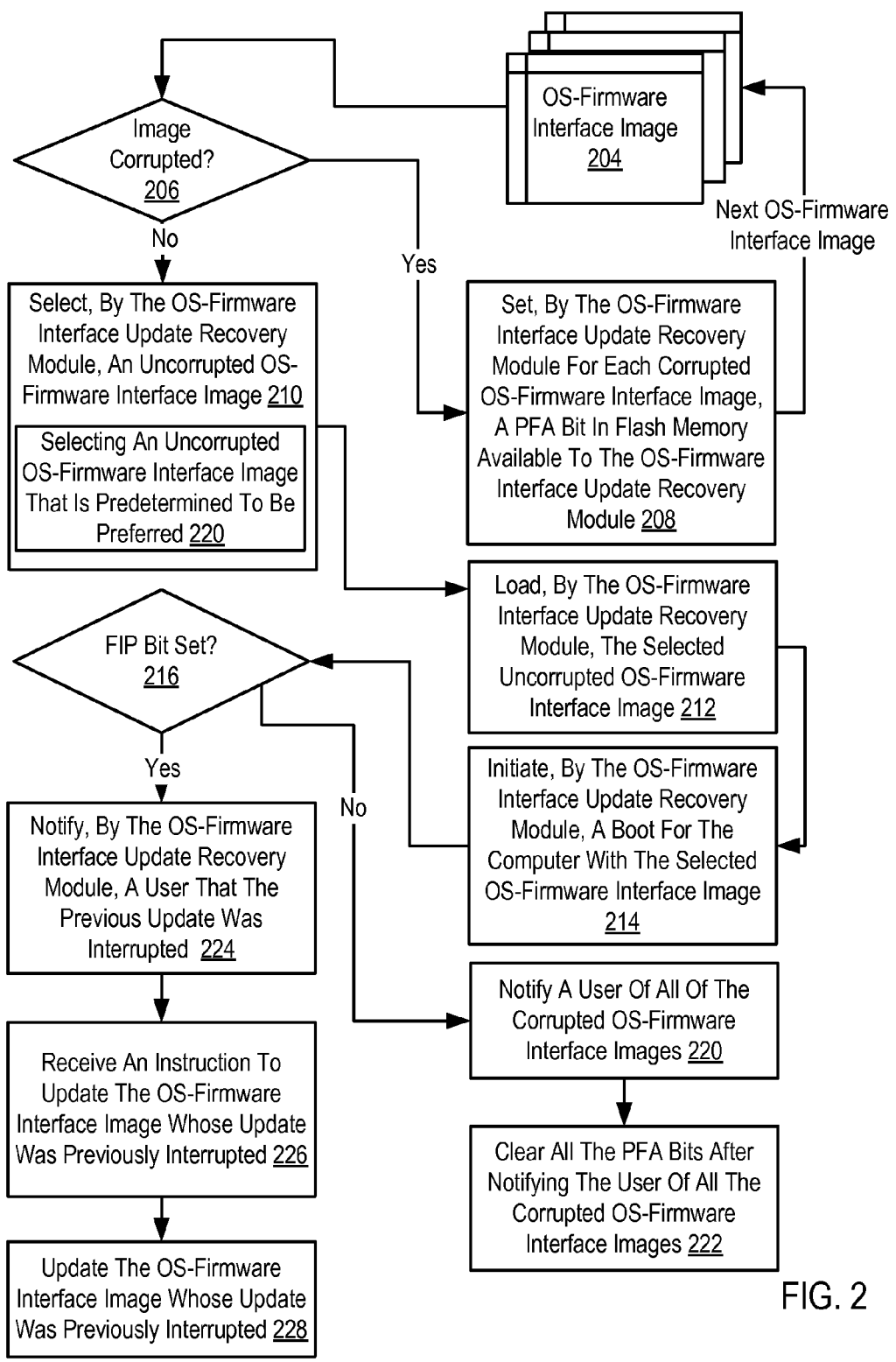
FIG. 2 sets forth a flow chart illustrating an exemplary method of OS-firmware interface update recovery according to embodiments of the present invention.

For further explanation, FIG. 2 sets forth a flow chart illustrating an exemplary method of OS-firmware interface update recovery according to embodiments of the present invention. As mentioned above, the OS-firmware interface may be implemented as Basic Input/Output System ('BIOS'), Unified Extensible Firmware Interface ('UEFI'), or any other OS-firmware interface that will occur to those of skill in the art.

The method of FIG. 2 includes determining (206), by an OS-firmware interface update recovery module for each of a plurality of available OS-firmware interface images for booting a computer, whether each available OS-firmware interface image is corrupted or uncorrupted. Determining (206), for each of a plurality of available OS-firmware interface images for booting a computer, whether each available OS-firmware interface image is corrupted or uncorrupted maybe carried out by calculating a checksum of each image and comparing that checksum with a known value for an uncorrupted image. If the checksum and the known value match, then the image is considered uncorrupted. If the checksum and the known value do not match, then the image is considered corrupted.

The method of FIG. 2 includes setting (208), by the OS-firmware interface update recovery module for each corrupted OS-firmware interface image, a predictive failure analysis ('PFA') bit in nonvolatile memory available to the OS-firmware interface update recovery module. A PFA bit is a well known bit in nonvolatile memory used to designate that one or more of the OS-firmware interface images may be corrupted. In some embodiments, a single PFA bit set to true may be used to designate that any one of the available OS-firmware interface images may be corrupted. In alternative embodiments, a PFA bit is assigned to each OS-firmware interface image, and in such embodiments, a PFA bit set to true specifies that a particular OS-firmware interface image may be corrupted.

The method of FIG. 2 also includes selecting (210), by the OS-firmware interface update recovery module, an uncorrupted OS-firmware interface image. In the example of FIG. 2, selecting (210) from one or more uncorrupted OS-firmware interface images from a plurality of available OS-firmware interface images a OS-firmware interface image further comprises selecting (220) an uncorrupted OS-firmware interface image that is predetermined to be preferred. An OS-firmware interface image may be preferred to another because it is a newer version of the OS-firmware interface image, better suited for the computer, or for other reasons as will occur to those of skill in the art.

In an alternative embodiment, more than one identical OS-firmware interface images are stored in nonvolatile memory. One such identical OS-firmware interface image maybe designated as a primary OS-firmware interface image and another may be designated as a backup OS-firmware interface image for use in cases where the primary image is corrupted. In such embodiments, selecting (210), by the OS-firmware interface update recovery module, an uncorrupted OS-firmware interface image includes selecting the primary OS-firmware interface image if it is uncorrupted and selecting an uncorrupted backup OS-firmware interface image if the primary OS-firmware interface image is corrupted.

The method of FIG. 2 also includes loading (212), by the OS-firmware interface update recovery module, the selected uncorrupted OS-firmware interface image. Loading (212), by the OS-firmware interface update recovery module, the selected uncorrupted OS-firmware interface image may be carried out by loading (212) the selected uncorrupted OS-firmware interface image into RAM and executing the loaded uncorrupted OS-firmware interface image from RAM. In alternative embodiments of the present invention, the selected uncorrupted OS-firmware interface image may be executed from nonvolatile memory. Executing the uncorrupted OS-firmware interface image from nonvolatile memory is typically less efficient than executing the image from RAM.

The method of FIG. 2 also includes initiating (214), by the OS-firmware interface update recovery module, a boot for the computer with the selected OS-firmware interface image. Initiating (214), by the OS-firmware interface update recovery module, a boot for the computer with the selected OS-firmware interface image includes executing the OS-firmware interface image to begin booting the computer.

The method of FIG. 2 also includes determining (216), by the OS-firmware interface update recovery module during the POST function of booting the computer in dependence upon a flash-in-progress bit set in nonvolatile memory available to the OS-firmware interface update recovery module, whether a previous update to one of the available OS-firmware interface images was interrupted. The power-on self-test ('POST') includes a pre-boot sequence for the OS-firmware interface. POST is typically the first step of the more general process called initial program load (IPL) or booting. POST initializes and configures a processor and then executes a defined series of tests to determine if the computer hardware is working properly. Any errors found during POST are typically stored or reported through auditory or visual means, for example through a series of beeps, flashing LEDs or text displayed on a display. Once the POST sequence completes, execution is typically handed over to the normal boot sequence which typically runs a boot loader or operating system.

A flash-in-progress bit is a well-known bit in nonvolatile memory used to designate that an OS-firmware interface image is currently being updated. If the flash-in-progress bit is set to true then an OS-firmware interface image is currently being updated and if the bit is set to false then the OS-firmware interface image is currently not being updated. If during the POST function of booting the computer the flash-in-progress bit is set to true, then the a previous update to an OS-firmware interface image was interrupted prior to completing because if the update was properly completed then the flash-in-progress bit would have been restored to false.

In some embodiments of the present invention, a single flash-in-progress bit is used for all the OS-firmware interface images. In such cases, if during the POST function of booting the computer the flash-in-progress bit is set to true, then the a previous update to any one of the OS-firmware interface images was interrupted prior to completing. In other embodiments of the present invention, a flash-in-progress bit is used for each of the OS-firmware interface images. In such cases, if during the POST function of booting the computer the flash-in-progress bit is set to true, then the a previous update to the selected uncorrupted OS-firmware interface images currently booting the computer was interrupted.

The method of FIG. 2 includes notifying (224), by the OS-firmware interface update recovery module, a user that the previous update was interrupted if the previous update to one of the available OS-firmware interface images interrupted. Notifying, by the OS-firmware interface update recovery module, a user that the previous update was interrupted may be carried out by storing a report for the user identifying that the previous update was interrupted, or reporting to the user that the previous update was interrupted through auditory or visual means, such as for example a series of beeps, flashing LEDs or text displayed on a display, or in any other way that will occur to those of skill in the art.

In some embodiments of the present invention, notifying a user that the previous update was interrupted if the previous update to one of the available OS-firmware interface images interrupted includes notifying the user without specifying the particular OS-firmware interface image whose update was interrupted. In other embodiments of the present invention, notifying (224) a user that the previous update was interrupted if the previous update to one of the available OS-firmware interface images interrupted includes specifying the particular OS-firmware interface image that was interrupted.

The method of FIG. 2 also includes notifying (220) a user of all of the corrupted OS-firmware interface images if the previous update to one of the available OS-firmware interface images was not interrupted. Notifying (220) a user of all of the corrupted OS-firmware interface images may be carried out by storing a report for the user identifying the corrupted image, or reporting to the user that the an image was corrupted through auditory or visual means, such as for example a series of beeps, flashing LEDs or text displayed on a display, or in any other way that will occur to those of skill in the art.

The method of FIG. 2 also includes clearing (222) all the PFA bits after notifying the user of all the corrupted OS-firmware interface images. Clearing (222) all the PFA bits after notifying the user of all the corrupted OS-firmware interface images may be carried out by setting all the PFA bits in nonvolatile memory to false.

The method of FIG. 2 also includes receiving (226) an instruction to update the OS-firmware interface image whose update was previously interrupted. Receiving (226) an instruction to update the OS-firmware interface image whose update was previously interrupted may include receiving a copy of the OS-firmware interface image update that was previously interrupted.

The method of FIG. 2 also includes updating (228) the OS-firmware interface image whose update was previously interrupted. Updating (228) the OS-firmware interface image whose update was previously interrupted includes flashing the OS-firmware interface image by writing an updated version of the OS-firmware interface image over the previous version of the OS-firmware interface image.

Exemplary embodiments of the present invention are described largely in the context of a fully functional computer system for OS-firmware interface update recovery. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating system ('OS')-firmware interface update recovery, the method comprising:
   determining, by an OS-firmware interface update recovery module for each of a plurality of available OS-firmware interface images for booting a computer, whether each available OS-firmware interface image is corrupted or uncorrupted, wherein the OS-firmware interface update recovery module comprises a module of automated computing machinery;
   setting, by the OS-firmware interface update recovery module for each corrupted OS-firmware interface image, a predictive failure analysis ('PFA') bit in nonvolatile memory available to the OS-firmware interface update recovery module;
   selecting, by the OS-firmware interface update recovery module, an uncorrupted OS-firmware interface image;
   initiating, by the OS-firmware interface update recovery module, a boot for the computer with the selected OS-firmware interface image;
   determining, by the OS-firmware interface update recovery module during the POST function of booting the computer in dependence upon a flash-in-progress bit set in nonvolatile memory available to the OS-firmware interface update recovery module, whether a previous update to one of the available OS-firmware interface images was interrupted;
   notifying, by the OS-firmware interface update recovery module, a user that the previous update was interrupted if the previous update to one of the available OS-firmware interface images interrupted;
   notifying a user of all of the corrupted OS-firmware interface images if the previous update to one of the available OS-firmware interface images was not interrupted; and
   clearing all the PFA bits after notifying the user of all the corrupted OS-firmware interface images.

2. The method of claim 1 wherein selecting from one or more uncorrupted OS-firmware interface images from a plurality of available OS-firmware interface images a OS-firmware interface image further comprises selecting an uncorrupted OS-firmware interface image that is predetermined to be preferred.

3. The method of claim 1 further comprising receiving an instruction to update the OS-firmware interface image whose update was previously interrupted.

4. The method of claim 1 further comprising updating the OS-firmware interface image whose update was previously interrupted.

5. The method of claim 1 wherein the OS-firmware interface comprises Basic Input/Output System ('BIOS').

6. The method of claim 1 wherein the OS-firmware interface comprises Unified Extensible Firmware Interface ('UEFI').

7. Apparatus for operating system ('OS')-firmware interface update recovery, the apparatus comprising a computer processor, a computer memory operatively coupled to the computer processor, the computer memory having disposed within it computer program instructions capable of:
   determining, by an OS-firmware interface update recovery module for each of a plurality of available OS-firmware interface images for booting a computer, whether each available OS-firmware interface image is corrupted or uncorrupted, wherein the OS-firmware interface update recovery module comprises a module of automated computing machinery;

setting, by the OS-firmware interface update recovery module for each corrupted OS-firmware interface image, a predictive failure analysis ('PFA') bit in nonvolatile memory available to the OS-firmware interface update recovery module;

selecting, by the OS-firmware interface update recovery module, an uncorrupted OS-firmware interface image;

initiating, by the OS-firmware interface update recovery module, a boot for the computer with the selected OS-firmware interface image;

determining, by the OS-firmware interface update recovery module during the POST function of booting the computer in dependence upon a flash-in-progress bit set in nonvolatile memory available to the OS-firmware interface update recovery module, whether a previous update to one of the available OS-firmware interface images was interrupted;

notifying, by the OS-firmware interface update recovery module, a user that the previous update was interrupted if the previous update to one of the available OS-firmware interface images interrupted;

notifying a user of all of the corrupted OS-firmware interface images if the previous update to one of the available OS-firmware interface images was not interrupted; and clearing all the PFA bits after notifying the user of all the corrupted OS-firmware interface images.

8. The apparatus of claim 7 wherein computer program instructions capable of selecting from one or more uncorrupted OS-firmware interface images from a plurality of available OS-firmware interface images a OS-firmware interface image further comprises computer program instructions capable of selecting an uncorrupted OS-firmware interface image that is predetermined to be preferred.

9. The apparatus of claim 7 wherein the OS-firmware interface comprises Basic Input/Output System ('BIOS').

10. The apparatus of claim 7 wherein the OS-firmware interface comprises Unified Extensible Firmware Interface ('UEFI').

11. A computer program product for operating system ('OS')-firmware interface update recovery, the computer program product disposed in a non-transitory computer readable medium, the computer program product comprising computer program instructions capable of:

determining, by an OS-firmware interface update recovery module for each of a plurality of available OS-firmware interface images for booting a computer, whether each available OS-firmware interface image is corrupted or uncorrupted, wherein the OS-firmware interface update recovery module comprises a module of automated computing machinery;

setting, by the OS-firmware interface update recovery module for each corrupted OS-firmware interface image, a predictive failure analysis ('PFA') bit in nonvolatile memory available to the OS-firmware interface update recovery module;

selecting, by the OS-firmware interface update recovery module, an uncorrupted OS-firmware interface image;

initiating, by the OS-firmware interface update recovery module, a boot for the computer with the selected OS-firmware interface image;

determining, by the OS-firmware interface update recovery module during the POST function of booting the computer in dependence upon a flash-in-progress bit set in nonvolatile memory available to the OS-firmware interface update recovery module, whether a previous update to one of the available OS-firmware interface images was interrupted;

notifying, by the OS-firmware interface update recovery module, a user that the previous update was interrupted if the previous update to one of the available OS-firmware interface images interrupted;

notifying a user of all of the corrupted OS-firmware interface images if the previous update to one of the available OS-firmware interface images was not interrupted; and clearing all the PFA bits after notifying the user of all the corrupted OS-firmware interface images.

12. The computer program product of claim 11 wherein computer program instructions capable of selecting from one or more uncorrupted OS-firmware interface images from a plurality of available OS-firmware interface images a OS-firmware interface image further comprise computer program instructions capable of selecting an uncorrupted OS-firmware interface image that is predetermined to be preferred.

13. The computer program product of claim 11 further comprising computer program instructions capable of receiving an instruction to update the OS-firmware interface image whose update was previously interrupted.

14. The computer program product of claim 11 further comprising computer program instructions capable of updating the OS-firmware interface image whose update was previously interrupted.

15. The computer program product of claim 11 wherein the OS-firmware interface comprises Basic Input/Output System ('BIOS').

16. The computer program product of claim 11 wherein the OS-firmware interface comprises Unified Extensible Firmware Interface ('UEFI').

* * * * *